United States Patent
Diaz, Jr. et al.

(10) Patent No.: US 8,657,127 B2
(45) Date of Patent: Feb. 25, 2014

(54) GUN AND FISHING ROD HOLDER

(75) Inventors: Fred M. Diaz, Jr., Oxford, MI (US);
Patrick T. Muldoon, Adrian, MI (US);
Brian A. Rogos, Rochester, MI (US);
James P. Sassorossi, Oakland, MI (US);
Timothy B. Sikes, Grass Lake, MI (US);
Andrew C. Mcginnis, Novi, MI (US);
Richard J. Galler, Ypsilanti, MI (US);
Thomas A. Daily, Walled Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 232 days.

(21) Appl. No.: 12/855,745

(22) Filed: Aug. 13, 2010

(65) Prior Publication Data

US 2012/0037579 A1 Feb. 16, 2012

(51) Int. Cl.
*B65D 85/20* (2006.01)

(52) U.S. Cl.
USPC ......... 211/64; 211/70.8; 269/156; 269/289 R; 206/315.1; 206/315.11

(58) Field of Classification Search
USPC ........ 211/62, 63, 64, 65, 66, 67, 68, 70, 70.2, 211/70.3, 70.4, 70.5, 70.8, 78, 163, 5, 53, 211/56, 58, 60.1, 77, 85.3, 85.6, 85.7, 164, 211/196, 205; 108/28; 269/156, 235, 258, 269/275, 289 R, 99; 206/315.1, 315.11, 370, 206/439; 248/226.11, 227.4, 228.6, 228.7, 248/230.6, 230.7, 231.71, 231.81, 309.1, 248/313, 316.1, 316.7, 316.8; 42/94; 294/141–143; 422/300
See application file for complete search history.

(56) References Cited

U.S. PATENT DOCUMENTS

| | | | | |
|---|---|---|---|---|
| 406,828 A | * | 7/1889 | Fietsch | 101/385 |
| 410,414 A | * | 9/1889 | Hall, Sr. | 269/45 |
| 511,844 A | * | 1/1894 | Houston | 269/109 |
| 842,007 A | * | 1/1907 | Parker | 269/45 |
| 1,897,672 A | * | 2/1933 | Neumann | 206/315.2 |
| 2,017,088 A | * | 10/1935 | Bihler | 211/70 |
| 2,693,635 A | * | 11/1954 | Chapman et al. | 269/156 |
| 2,783,895 A | | 3/1957 | Agostini et al. | |
| 2,881,645 A | * | 4/1959 | Kruchten | 269/182 |
| 2,964,166 A | * | 12/1960 | Lehner et al. | 206/579 |
| 3,487,945 A | * | 1/1970 | Barham | 211/43 |
| 4,022,454 A | * | 5/1977 | Bredvik | 269/100 |
| 4,084,735 A | * | 4/1978 | Kappas | 224/328 |
| 4,109,796 A | * | 8/1978 | Mitchell | 211/70.8 |
| 4,113,108 A | * | 9/1978 | Anderson | 211/43 |
| 4,170,801 A | * | 10/1979 | Ward | 114/343 |
| 4,548,392 A | * | 10/1985 | Rickling | 269/156 |
| 4,607,772 A | * | 8/1986 | Hancock | 224/442 |

(Continued)

FOREIGN PATENT DOCUMENTS

CA 2363195 A1 5/2003
CA 2418606 6/2010

*Primary Examiner* — Joshua Rodden
(74) *Attorney, Agent, or Firm* — Ralph E. Smith

(57) ABSTRACT

A gun and fishing rod holder. The holder comprises a pair of stands mounted on a table. The stands can be arranged in first (gun holding) and second (fishing rod holding) configurations. The first (gun holding) configuration of a stand comprises a pair of U-shaped channels. The second (fishing rod holding) configuration of a stand comprises an upside-down U-shaped support having a plurality of rod holders.

18 Claims, 9 Drawing Sheets

(56) References Cited

U.S. PATENT DOCUMENTS

| | | | | |
|---|---|---|---|---|
| 4,805,888 A * | 2/1989 | Bishop | ............................ | 269/99 |
| 4,823,673 A * | 4/1989 | Downing | ..................... | 89/37.04 |
| 5,058,302 A * | 10/1991 | Minneman | ......................... | 42/94 |
| 5,242,050 A * | 9/1993 | Billings | .................... | 206/315.11 |
| 5,325,792 A * | 7/1994 | Mulloy | ............................ | 108/28 |
| 5,360,190 A | 11/1994 | Walker et al. | | |
| D359,392 S * | 6/1995 | Bellington | ..................... | D3/262 |
| 5,499,802 A * | 3/1996 | Haberle | .......................... | 269/99 |
| 5,573,230 A * | 11/1996 | Lambertini | .................... | 269/235 |
| 5,697,181 A * | 12/1997 | Savant | ............................... | 42/94 |
| 5,709,373 A * | 1/1998 | Wasylynko | ..................... | 269/16 |
| 5,740,926 A * | 4/1998 | Mulloy | ........................... | 211/43 |
| 5,759,502 A * | 6/1998 | Spencer et al. | ................ | 422/300 |
| 5,791,610 A * | 8/1998 | Sanchez | ...................... | 248/176.1 |
| 5,871,098 A * | 2/1999 | Storck | ............................ | 206/557 |
| 6,032,999 A * | 3/2000 | York et al. | .................... | 294/143 |
| 6,099,812 A * | 8/2000 | Allen et al. | .................... | 422/300 |
| 6,199,734 B1 * | 3/2001 | Meeks | ............................ | 224/401 |
| 6,338,218 B1 * | 1/2002 | Hegler | ............................. | 42/94 |
| 6,375,134 B1 * | 4/2002 | Goldschmidt et al. | ........ | 248/154 |
| 6,457,618 B1 * | 10/2002 | Hancock et al. | .............. | 224/401 |
| 6,484,913 B1 * | 11/2002 | Hancock et al. | .............. | 224/401 |
| 6,564,949 B1 * | 5/2003 | Saathoff | ....................... | 211/70.6 |
| 6,574,899 B1 * | 6/2003 | Mostello | ........................... | 42/94 |
| 6,641,014 B2 * | 11/2003 | McNalley | ...................... | 224/405 |
| 6,685,070 B2 * | 2/2004 | Szigeti | ........................... | 224/321 |
| 6,695,183 B2 * | 2/2004 | Hancock et al. | .............. | 224/401 |
| 6,789,712 B2 * | 9/2004 | Gates et al. | .................... | 224/401 |
| 6,843,395 B1 * | 1/2005 | Martin et al. | .................. | 224/401 |
| 6,902,089 B2 * | 6/2005 | Carnevali | ....................... | 224/553 |
| 6,913,286 B2 * | 7/2005 | Kramer | .......................... | 280/762 |
| 6,929,223 B2 * | 8/2005 | Hancock et al. | .............. | 248/74.2 |
| 6,986,446 B2 | 1/2006 | Murray et al. | | |
| 7,100,808 B2 * | 9/2006 | Hancock et al. | .............. | 224/547 |
| 7,281,346 B1 * | 10/2007 | Cook et al. | ....................... | 42/94 |
| 7,337,934 B2 * | 3/2008 | Alling et al. | ................... | 224/401 |
| 7,503,459 B2 * | 3/2009 | Grayson | ....................... | 211/70.8 |
| 7,559,444 B1 | 7/2009 | Church | | |
| 7,584,861 B2 | 9/2009 | Werner | | |
| 7,726,478 B2 * | 6/2010 | Potterfield et al. | ............ | 206/317 |
| 7,739,962 B2 * | 6/2010 | Zhu et al. | ........................ | 108/28 |
| 2003/0042282 A1 * | 3/2003 | Gates et al. | .................... | 224/560 |
| 2003/0201634 A1 * | 10/2003 | Kramer | .......................... | 280/762 |
| 2004/0113041 A1 * | 6/2004 | Hancock et al. | .............. | 248/688 |
| 2007/0205123 A1 * | 9/2007 | Bettenhausen et al. | ....... | 206/363 |
| 2007/0294929 A1 * | 12/2007 | Potterfield et al. | ............ | 42/94 |
| 2009/0183433 A1 | 7/2009 | Cheung et al. | | |
| 2010/0164158 A1 * | 7/2010 | Weissenborn | ................ | 269/101 |

\* cited by examiner

GUN AND FISHING ROD HOLDER

FIELD OF THE INVENTION

The technology herein relates generally to the storage of guns and/or fishing rods in vehicles, and more particularly to locking storage units for the same mounted in a pickup truck bed.

BACKGROUND OF THE INVENTION

Gun and fishing rod racks for vehicles are well known. Generally, such racks mount the guns or fishing rods inside and/or outside the vehicle. For instance, U.S. Pat. No. 5,815,976 to Jernigan, et al. shows a series of sleeve holders mounted to a connector plate that connects directly to an exterior bumper of a vehicle. U.S. Pat. No. 6,986,446 to Murray et al. shows a gun mount apparatus that securely attaches to one or more of the seat frames inside the vehicle. Other apparatuses for mounting hunting equipment to vehicles, such as U.S. Pat. No. 7,559,444 to Church, show rotatable locking mechanisms to secure a hunting bow or rifle to the rear of an all terrain vehicle.

BRIEF SUMMARY OF THE INVENTION

In various example embodiments, the technology described herein provides an apparatus for storing guns (i.e., rifles, shotguns and the like) and fishing rods on a vehicle. The apparatus can be mounted inside a storage unit that is part of the vehicle, i.e., one that is part of a pickup truck bed. Optionally, the storage unit can be a locking storage unit. An example of such a locking storage unit is described in U.S. Patent Application Publication No. 2009/0074532 A1 to Dupret, et al. Such storage units provide additional storage in a sidewall of a bed of a pickup truck without reducing overall storage space in the bed itself. The opaque, locked unit deters theft and protects the items from damage.

The apparatus consists of two upright stands. The stands are adjustable to provide variable length storage and can be rotated about a vertical axis to provide storage for more than one type of item. For instance, in a first configuration, the stands comprise a pair of opposing U-shaped brackets for holding guns. The U-shaped brackets each form a channel with isolating fingers to secure guns, and have covers to hold the guns in each channel. The isolating fingers on the brackets provide stabilization for variable sized items, and are padded to prevent degrading the stored items. In a second configuration, achieved by rotating the stands 90 degrees, the stands provide a plurality of fishing rod slots.

The stands are mountable to a table in a plurality of positions, to provide variable length storage. In one embodiment, the stands are fastened directly to the table. Screws or other fasteners on the base of the stands hold the stands to the table. In another embodiment, the stands are seated within a track. Spring loaded thumbscrews, for example, hold the stands to the table in this embodiment, but when unscrewed, allows the stands to be rotated within the track to change the configuration of the apparatus.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

Figure 1A:
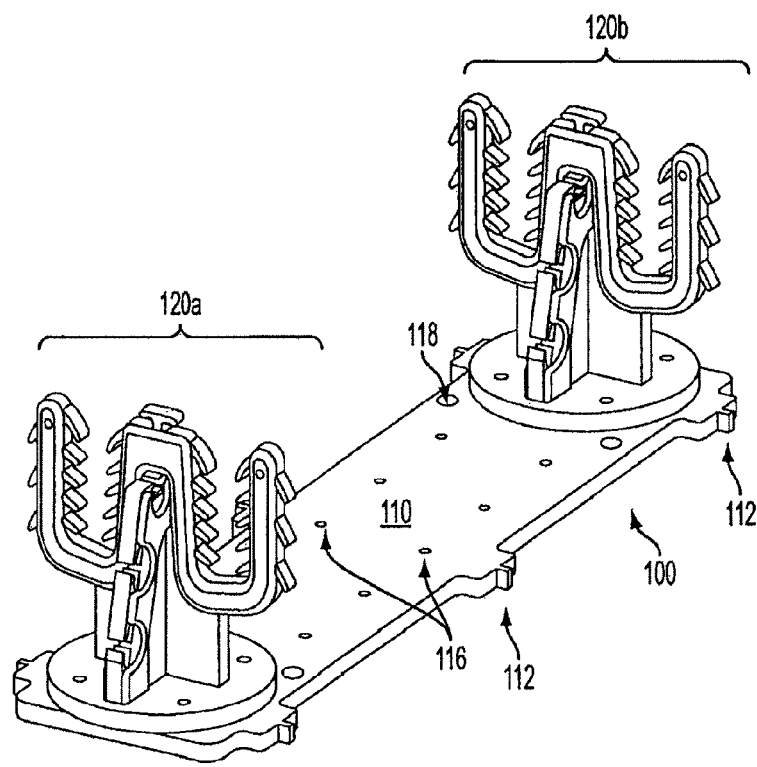
FIGS. 1A and 1B show perspective views of a first embodiment of a gun and fishing rod holder in a first (gun holding) configuration and a second (fishing rod holding) configuration, respectively.
Figure 1B:
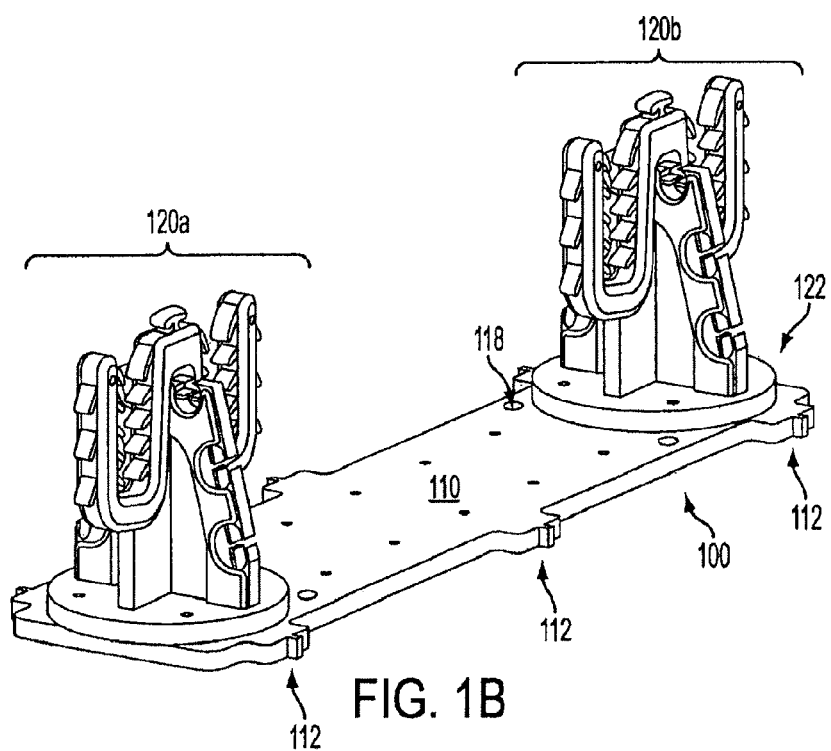

FIGS. 1A and 1B show a first embodiment of a gun and fishing rod holder 100 in a first (gun holding) configuration and second (fishing rod holding) configuration, respectively. Holder 100 consists of a table 110 having a plurality of stabilizers 112 and fastening points 116. A pair of stands 120a and 120b are releasably secured to the table at certain fastening points 116. FIG. 1A shows stands 120a and 120b mounted in a first, gun holding configuration, and FIG. 1B shows stands 120a and 120b mounted in a second, fishing rod holding configuration.

Figure 2:
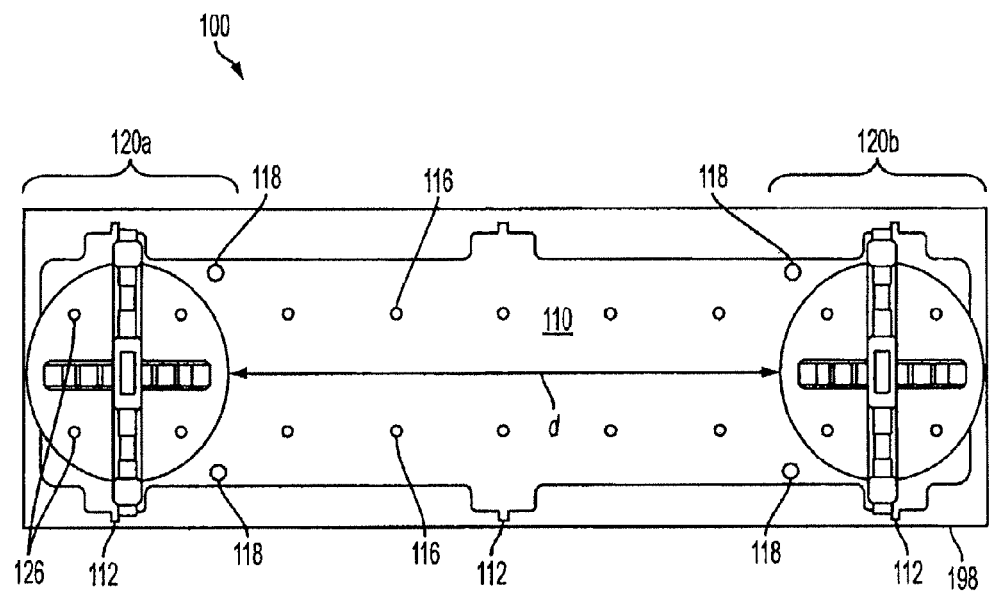
FIG. 2 shows a top down view of the gun and fishing rod holder in the first (gun holding) configuration.
Figure 3A:
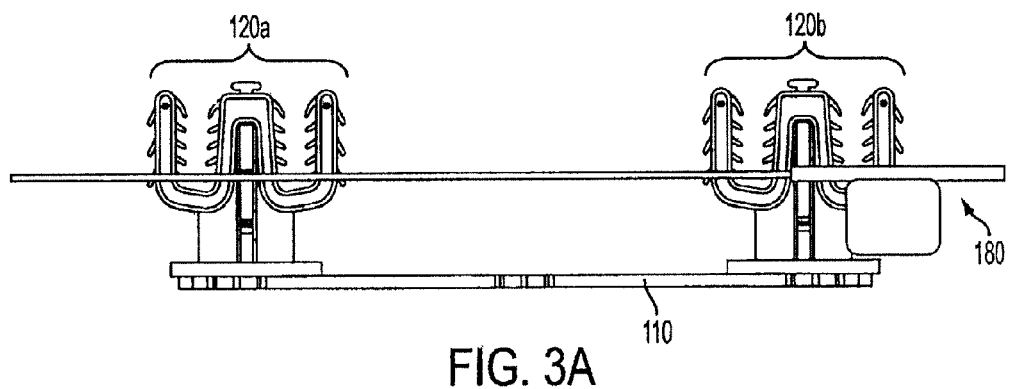
FIG. 3A shows a side view of the gun and fishing rod holder in the second (fishing rod holding) configuration.
Figure 9:
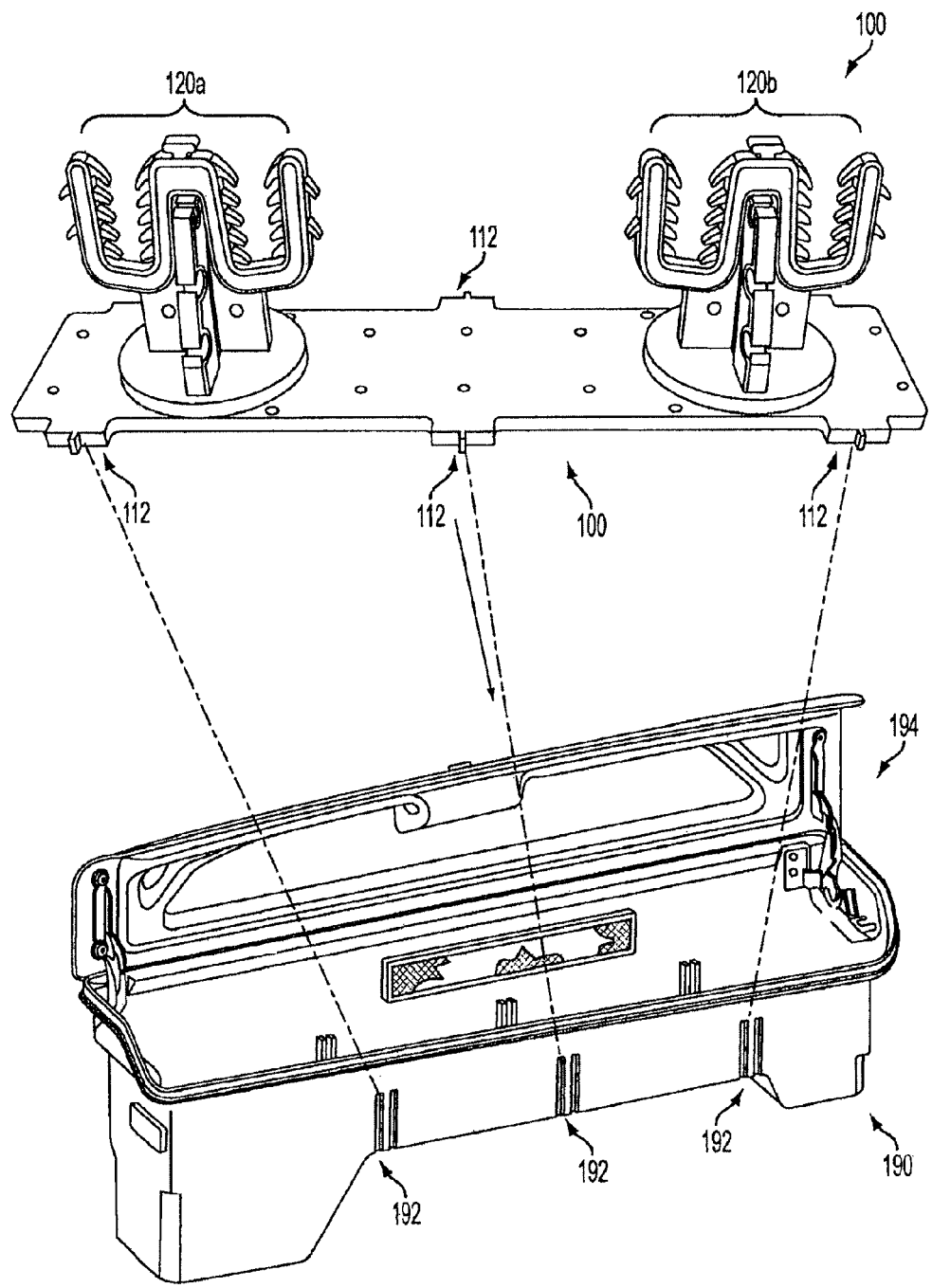
FIG. 9 shows a perspective view of the FIGS. 1A-1B gun and fishing rod holder being installed in a storage unit.

FIG. 2 shows a top-down view of the holder 100 of FIG. 1A, with table 110 secured to a surface 198, e.g., a floor of a storage unit 190 (FIG. 9). Table 110 is affixed to floor 198 by a plurality of locking points 118, using bolts or screws, scrivets, or other known fastening devices. As shown in FIG. 2, stands 120a and 120b each also have a plurality of fastening points 126. Stands 120a and 120b are installed on table 110 by aligning fastening points 116 and 126, and inserting fasteners, such as, e.g., screws or scrivets. In this manner, the length d between stands 120a and 120b, in a longitudinal direction of the table, can be adjusted to accommodate different sized guns and fishing rods. A plurality of stabilizers 112 are arranged about an outside edge of the table 110 for securing holder 100. FIG. 3A shows a side view of holder 100 in the second, fishing rod holding configuration, showing fishing rod 180 mounted thereon. FIG. 313 shows a side view of holder 100 in the first, gun holding configuration, showing gun 182 mounted thereon. As can be seen, the holder 100 accommodates and protects a gun 182 with a scope 183.

The two spaced apart stands 120a, 120b hold and stabilize the guns and fishing rods mounted thereon, where a first stand 120a supports/holds a portion of the supported gun or rod and the second spaced apart stand 120b supports/holds another portion of the same gun or rod. For example, one end of a gun is held by one stand 120a while the other end of the gun is held by the other spaced stand 120b. In this manner the holder is configured to support a plurality of guns and fishing rods.

Figure 4:
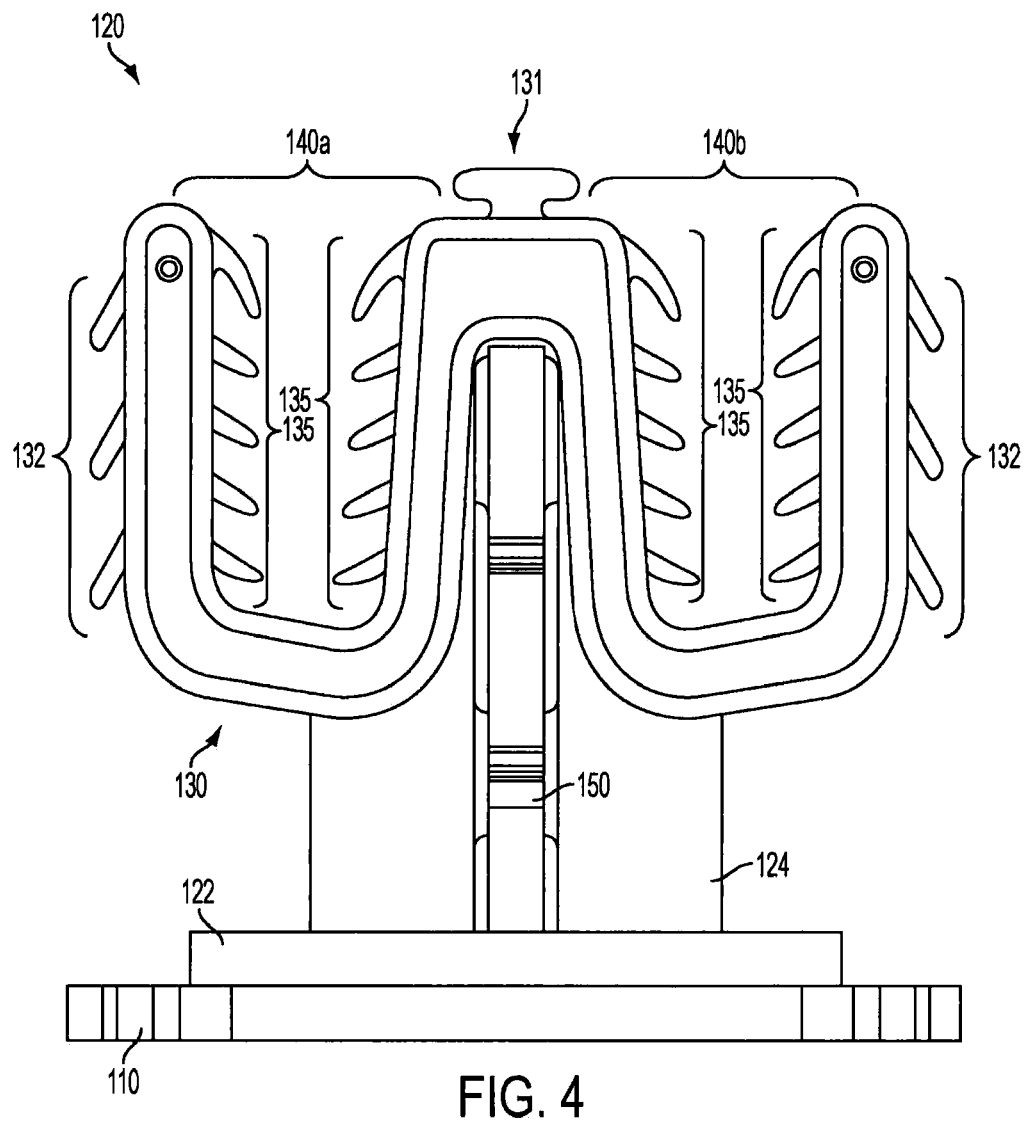
FIG. 4 shows a side view of the gun holding side of a stand of the FIGS. 1A-1B gun and fishing rod holder.

Stands 120a, 120b are configured so that they can be installed in one of two configurations. FIG. 4 shows an exemplary stand 120, as it would be installed on table 110 in the first, gun holding configuration as shown in FIG. 1A. Stand 120 comprises a cross-shaped supporting column 124 and circular base 122. Of course it is understood that the shapes of supporting column 124 and base 122 are exemplary, and that supporting column 124, for example, could be cylindrical and base 122 rectangular, or any other suitable shape.

Figure 3B:
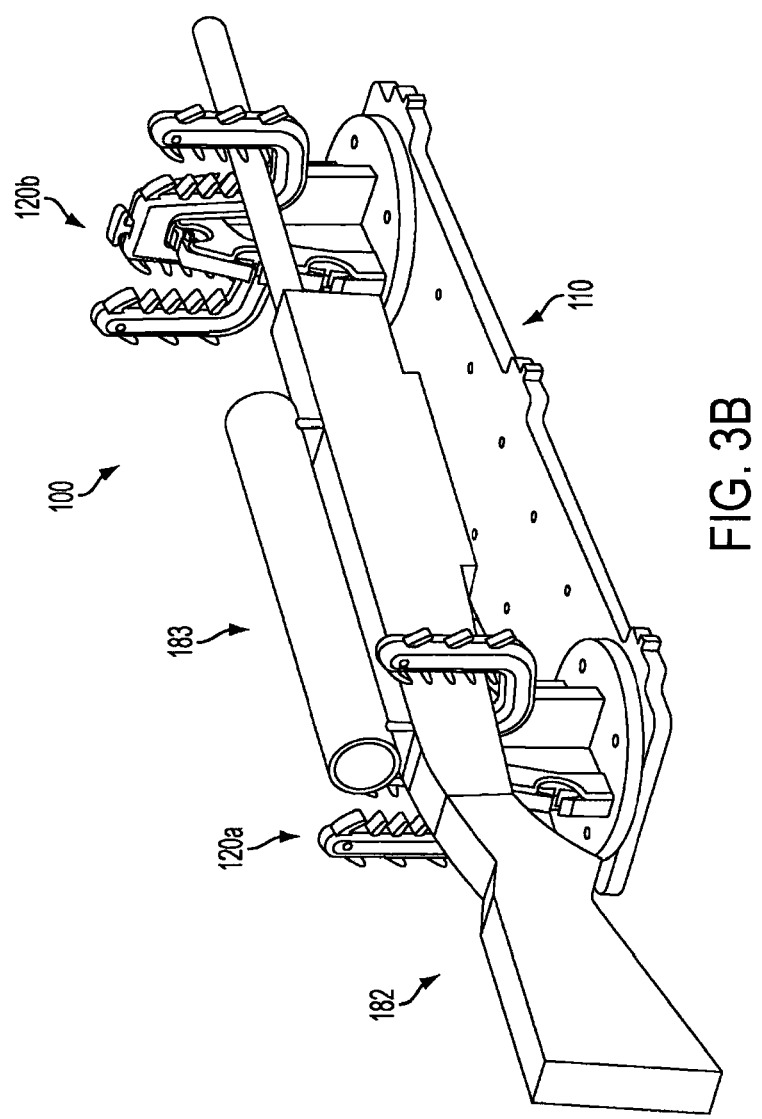
FIG. 3B shows a side view of the gun and fishing rod holder in the first (gun holding) configuration.
Figure 6:
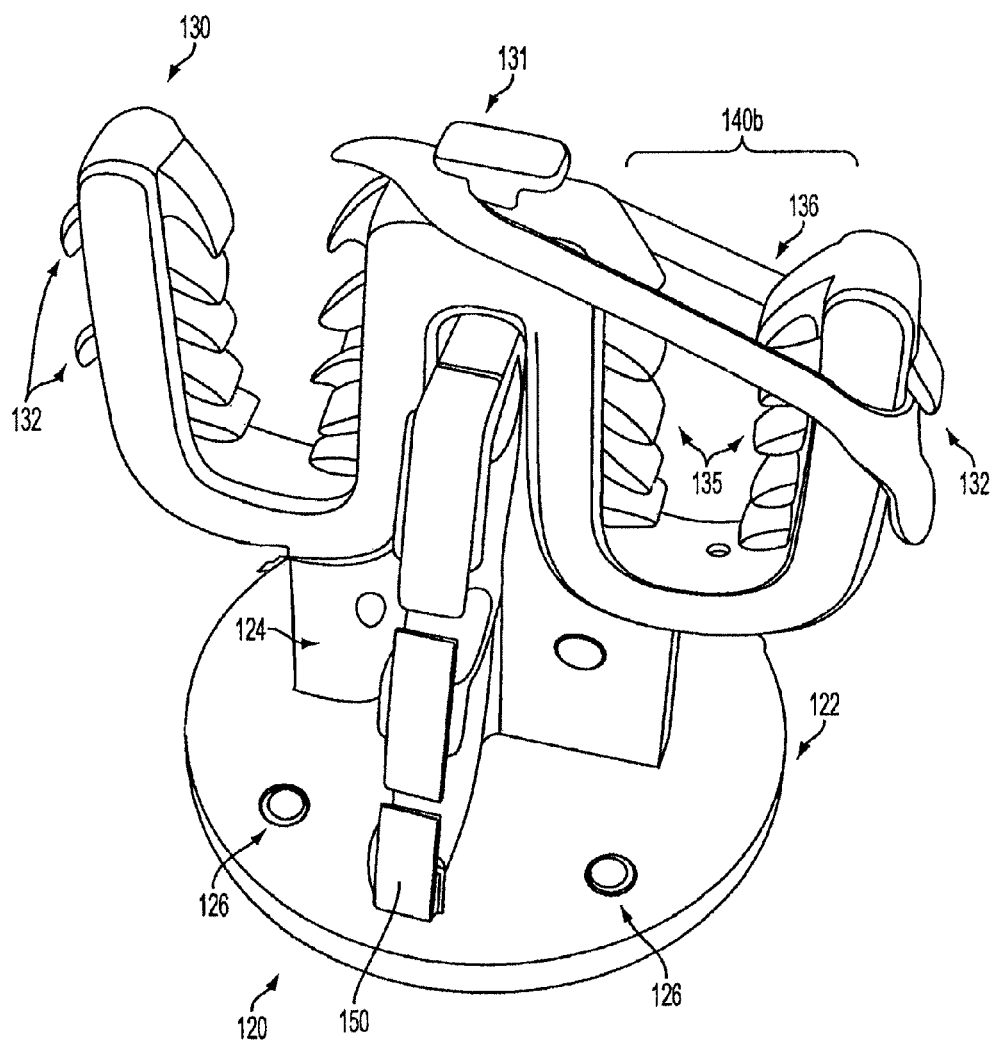
FIG. 6 shows a perspective view of the gun holding side of a stand of the FIGS. 1A-1B gun and fishing rod holder with an engaged cover.

A pair of U-shaped channels 140a and 140b are formed by carrier 130, which is attached to the top of supporting column 124. In a preferred embodiment, carrier 130 is formed from a single piece of plastic, metal, hardened rubber, or resilient material, e.g., an overmolded rubber structure. It is, however, understood that carrier 130 could be formed of a pair of U-shaped brackets machined, coated or otherwise fabricated. Isolating fingers 135 in the channels 140a, 140b provide stabilization for guns held therein, and are preferably formed of a flexible and resilient padding, such as rubber, or neoprene, so as to not degrade the guns. The fingers 135 are configured and positioned to hold and stabilize a portion of a gun therein, to isolate the gun from the vibrations inherent to being transported in the vehicle. This is beneficial for protecting more delicate accessories such as gun scopes 183 (FIG. 3B). A knob 131 and plurality of flanges 132 provide attachment points for a rubber cover or retention strap 136 (as shown in FIG. 6), which further secures any guns within the channels 140a, 140b. Of course it is understood that the rubber cover 136 is a retaining member, and may take other forms so long as it secures the gun within the U-shaped channels 140a and 140b.

Figure 5:
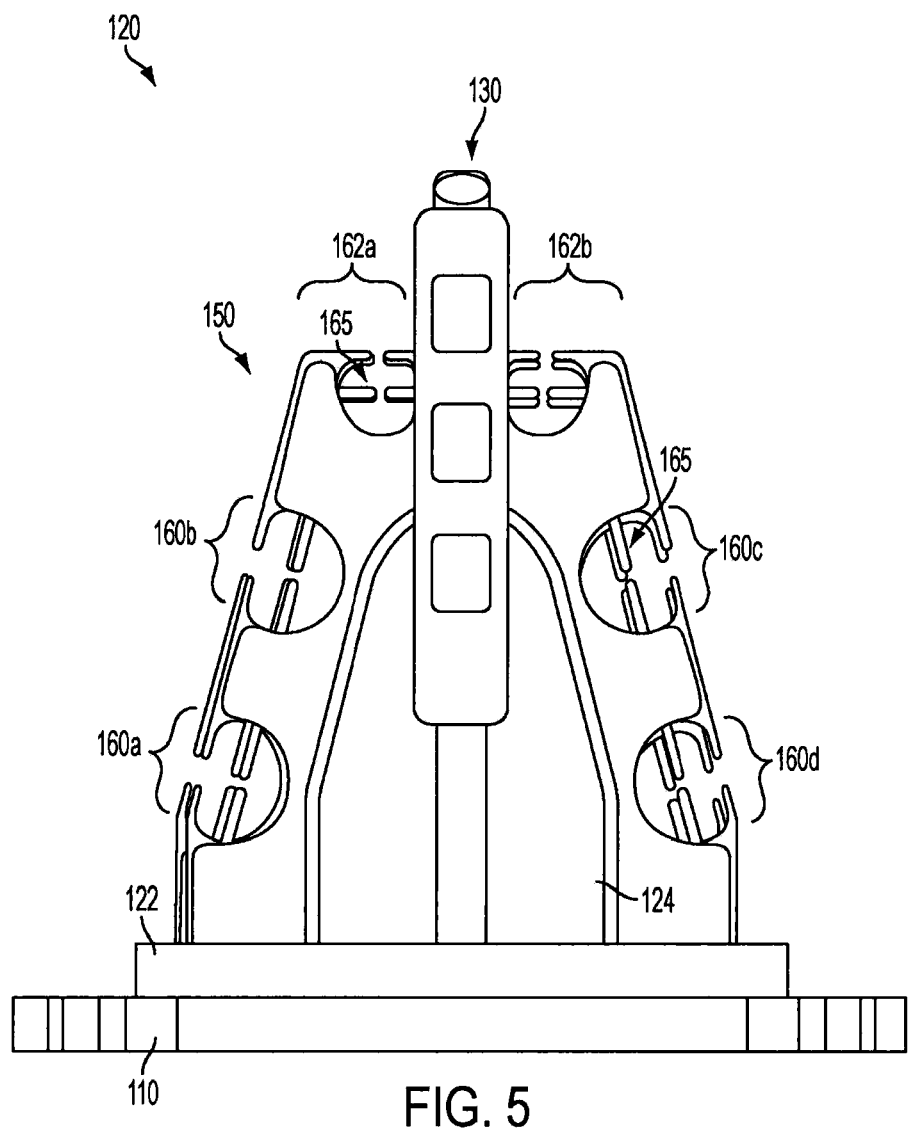
FIG. 5 shows a side view of the fishing rod holding side of a stand of the FIGS. 1A-1B gun and fishing rod holder.

FIG. 5 shows stand 120 rotated 90 degrees in the second, fishing rod holding configuration as shown in FIG. 1B. A plurality of fishing rod slots 160a-d, 162a-b of differing size (slots 160a-d are larger to accommodate larger diameter rods) are arranged about an upside-down U-shaped support 150 perpendicularly to carrier 130. Of course, it is understood that rod holders 160a-d, 162a-b could all be of different, or the same sizes, depending on need. As can be seen in FIGS. 4 and 5, carrier 130 is arranged over top support 150, but support 150 could also be arranged over top carrier 130. Each fishing rod slot 160a-d, 162a-b has resilient material fingers or retention flaps 165, e.g., rubber or neoprene to hold and stabilize the fishing rods therein while not degrading the rods.

Figure 7:
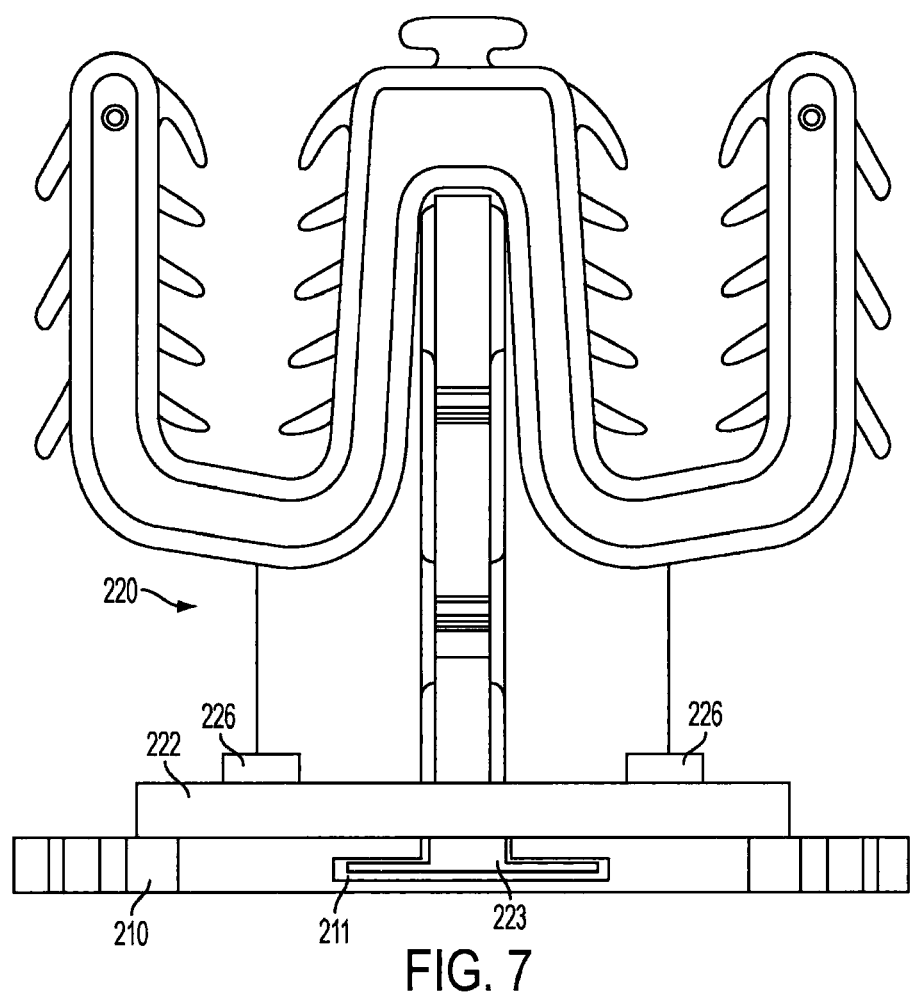
FIG. 7 shows a side view of a stand of a track-equipped second embodiment of a adjustable long gun and fishing rod holder in a first (gun holding) configuration.
Figure 8:
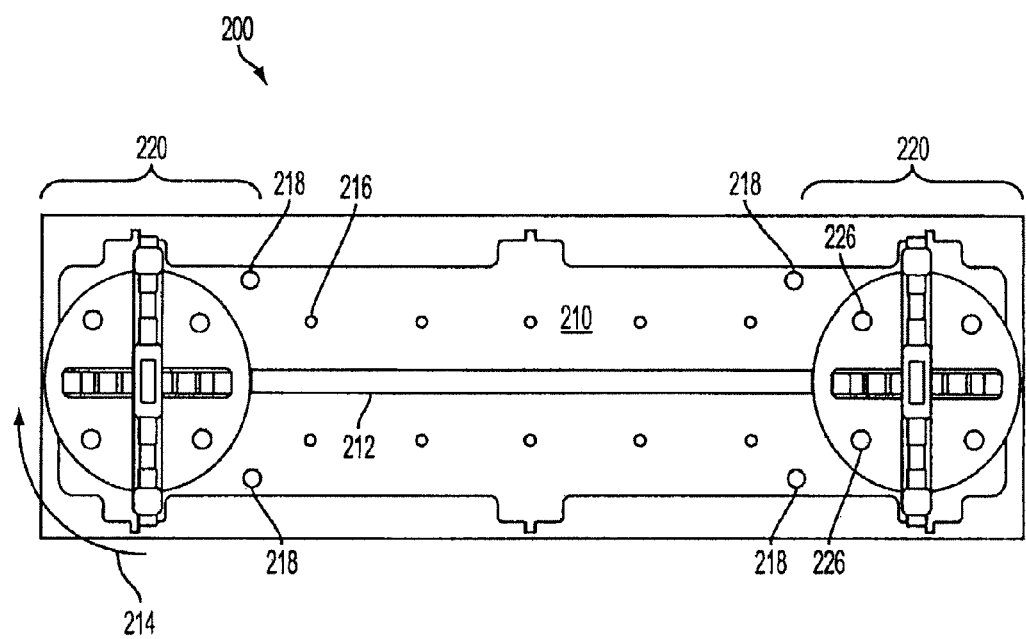
FIG. 8 shows a top down view of the track-equipped second embodiment of the adjustable long gun and fishing rod holder in the first (gun holding) configuration.

FIGS. 7 and 8 show a second embodiment of a gun and fishing rod holder 200. In this embodiment, holder 200 is equipped with a track 211 that runs lengthwise across table 210. As shown in FIG. 7, stand 220 is mounted in an upside-down T-shaped aperture in a track 211, permitting the stand to be moved longitudinally along the track 211. A complementary protrusion 223 on the stand 220 extends downward to engage the upside-down T-shaped aperture. In this manner, track 211 keeps stand 220 attached to table 210. Stand 220 is held secure to table 210 by a plurality of fasteners 226, e.g., thumbscrews that engage fastening points 216 on table 210. Like the first embodiment the second embodiment has a plurality of locking points 218 for attaching the table 210 to a surface 198, e.g., the floor of a storage unit (FIG. 9). When the fasteners 226 are not engaged, stand 220 is free to rotate about its center (shown by arrow 214) to change holder 200 from a first, gun holding to a second, fishing rod holding configuration. Optionally, the thumbscrews can be spring-loaded so they do not actually come out of the base 222.

FIG. 9 shows the stabilizers 112 of the FIG. 1A holder 100 aligning with corresponding notching 192 on interior sidewalls of a storage unit 190. When lid 194 is closed, the items stored on holder 100 can be secured out of sight. Optionally, lid 194 can be locking, providing the items with further protection from theft and damage.

It should be understood that although the first and second configurations of the described embodiments hold long guns with scopes and fishing rods, configurations for holding other items, such as bows or sporting equipment (e.g., hockey and lacrosse sticks) are possible.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. An apparatus for holding guns and fishing rods, the apparatus comprising:
    a pair of stands releasably secured to a table, each stand comprising a carrier having at least one channel, and a plurality of slots arranged perpendicularly to the at least one channel,
    wherein the pair of stands are rotationally adjustable between a first configuration in which corresponding ones of the channels of the pair of stands are aligned to hold a first item and a second configuration in which corresponding ones of the slots of the pair of stands are aligned to hold a second item, and
    wherein the table includes a plurality of spaced pairs of fastening points and each stand comprises a base with corresponding fastening points to facilitate adjustable positioning of the respective stand along a longitudinal direction of the table and being adaptable to a variable length of the first or second item, each stand being attached to the table with fasteners driven through the fastening points of the respective base to engage one of the spaced pair of fastening points on the table.

2. The apparatus of claim 1, wherein the table is mounted inside a storage unit.

3. The apparatus of claim 2, further including a plurality of stabilizers arranged around an outside edge of the table for engaging matching notching on sidewalls of the storage unit.

4. The apparatus of claim 1, wherein the first item is a gun.

5. The apparatus of claim 4, wherein the second item is a fishing rod.

6. The apparatus of claim 4, wherein the at least one channel of each carrier is a U-shaped channel.

7. The apparatus of claim 6, wherein an interior of each U-shaped channel has a plurality of isolating fingers arranged thereon.

8. The apparatus of claim 6, wherein the carrier is mounted on a support column.

9. The apparatus of claim 6, further including a knob on a top surface of the carrier and a plurality of flanges arranged on outside surfaces of the carrier.

10. The apparatus of claim 9, further including a cover configured to engage the knob and at least one of the flanges and which is configured to retain and stabilize the gun within at least one of the U-shaped channels.

11. The apparatus of claim 6, wherein said slots are configured to hold a fishing rod.

12. The apparatus of claim 11, wherein each slot of the plurality of slots has resilient fingers arranged therein.

13. The apparatus of claim 1, further including a plurality of locking points arranged on the table for affixing the table to a surface.

14. The apparatus of claim 1, wherein the fasteners are screws.

15. The apparatus of claim 1, wherein the table has a track and each stand has a complementary protrusion for engaging an aperture in the track.

16. The apparatus of claim 15, wherein the track extends lengthwise across the table.

17. The apparatus of claim 15, wherein each stand can rotate about a central axis while engaged with the track but not when fastened to the table.

18. The apparatus of claim 15, wherein the fasteners are thumbscrews.

* * * * *